Sept. 8, 1942.  L. D. ADAM  2,295,375

WEED GUARD FOR FISHING LURES

Filed June 10, 1941

INVENTOR.
Louis D. Adam
BY Frank M. Slough
HIS ATTORNEY

Patented Sept. 8, 1942

2,295,375

UNITED STATES PATENT OFFICE 2,295,375

WEED GUARD FOR FISHING LURES

Louis D. Adam, Ponca City, Okla., assignor to The American Fork & Hoe Company, Cleveland, Ohio, a corporation of Ohio Application June 10, 1941, Serial No. 397,442

2 Claims. (Cl. 43—39)

My invention relates to artificial bait and relates more particularly to improved weed guards to be associated therewith.

I am familiar with weed guards of the prior art which are attached to the body or to the line and adapted to have free movement with respect thereto as well as weed gards which are secured to the body by a retaining screw or rigidly secured to the lead line, said weed guards being provided for the purpose of preventing the engagement of weeds with the hook associated with the lure.

It is an object of my invention to provide a weed guard which will prevent the hook from becoming entangled with weeds or the like and which will be freely movable away from the hook when a fish "strikes" the same.

Another object of my invention is to provide a weed guard which is adapted to be freely movable away from and towards the bank, the movement however being restricted so that excessive movement in either direction is prevented.

Another object of my invention is to provide a weed guard of relatively few parts which will be inexpensive in manufacture and highly efficient in use.

A further object of my invention is to provide a weed guard which will embody, in its structure, integral stop means which will limit the forward and rearward movement of the guard while permitting a certain amount of such movement.

Other objects of my invention and the invention itself will become increasingly apparent by reference to the following description and drawing, said drawing forming a part of this specification, wherein.

Figure 1:
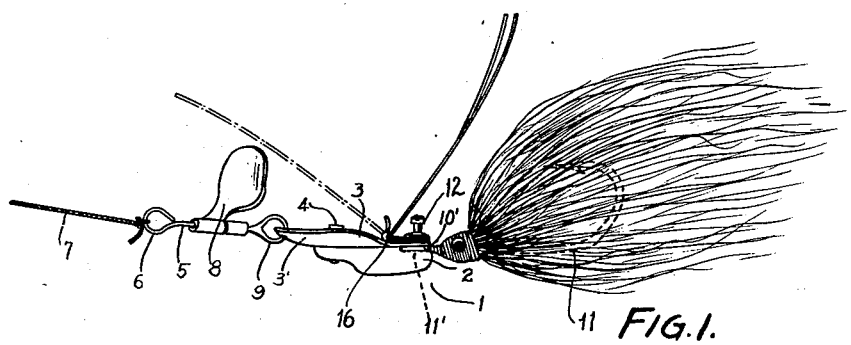
Fig. 1 is a side elevational view of the bait showing the improved weed guard of my invention associated therewith, the dotted lines showing an alternate position of the weed guard.
Figure 2:
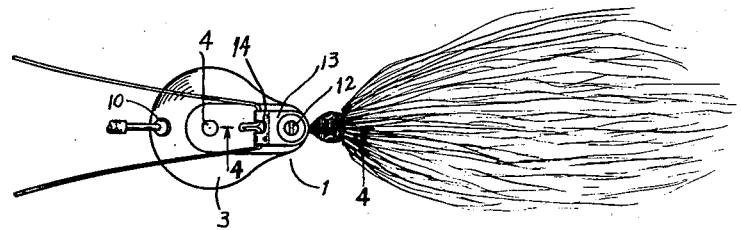
Fig. 2 is a top plan view of the improved weed guard of my invention.
Figure 3:
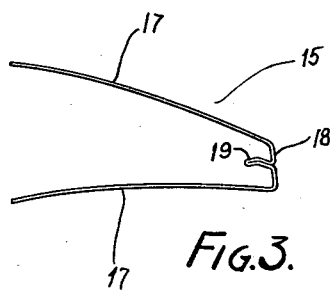
Fig. 3 is a perspective view of the weed guard.

Referring now to the drawing in all of which like parts are designated by like reference characters, the bait 1 of Figs. 1 and 2 comprises a body portion 2 formed of metal to which a plate 3 having an upwardly flanged skirt portion 3' is secured by a pin 4 which passes through the plate 3 and body 2. A spinner rod 5 having a forwardly disposed eye 6 connected to the fishing line 7 has a spinner 8 rotatably mounted upon the rod 5, said spinner being disposed upon said rod intermediate the forwardly disposed eye 6 and a rearwardly disposed eye 9 which is connected to the forward portion of the plate 3 through the centrally disposed perforation 10 in the leading edge of the skirt portion 3'.

A slot 10' is disposed rearwardly of said body in which the eye 11' of a hook 11 is adapted to be seated, pin means 12 being projected through a support element 13 disposed at the rear of said plate longitudinally thereof and through the plate 3 and the body portion 2. The support element 13 is formed, as shown in Figs. 1 and 2, of a rectangular strip of metal provided with a perforation centrally thereof, as shown at 14, the metal surrounding the perforation being folded back upon itself, to provide a cylindrical bore 16 through which the yoke portion 18 of the weed guard 15, later described herein, is disposed, the rearwardly disposed overlapped portions of said element 13 being adapted to have the pin means 12 projected through apertures 13', as hereinbefore described.

The improved weed guard 15 of my invention is adapted to be loosely journalled in the bore 16 formed by the overlapped portion of the support element 13 and adapted to move forwardly and rearwardly with respect thereto.

Figure 5:
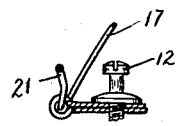
Fig. 5 is an enlarged sectional view similar to Fig. 4, but with the weed guard in another position.

The improved weed guard 15 of my invention, as shown, is preferably formed of a single strip of flexible wire bent into generally hairpin form, having a pair of depending prongs or legs 17, said legs being generally outwardly diverging and joined by the intermediate yoke portion 18, centrally of said yoke portion the wire being bent into a tongue 19, said tongue being bent inwardly and downwardly, as best shown in Fig. 5, the inwardly disposed portion being shown at 20 and the downwardly struck portion being shown at 21.

When the weed guard is normally disposed in the position shown in solid lines in Fig. 1, to protect the hook from becoming entangled with weeds and the like, the prongs are disposed upwardly from said hook, the inner ends of said prongs or legs being restrained against further movement than that shown by virtue of the yoke ends of the legs and the tongue portion 19 being engaged by inwardly disposed surfaces of the support element 13 surrounding the bore 16.

Figure 4:
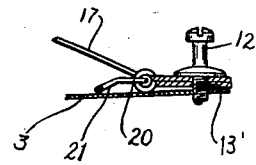
Fig. 4 is an enlarged sectional view taken from the line 4—4 of Fig. 2.

When a fish strikes at the hook 11, the weed guard takes the position shown in dotted lines in Fig. 1, and in solid lines in Figs. 2 and 4, whereby the guard is thrown into a forward position towards the line means, being adapted to then seat by virtue of its downwardly extending portion 21 of the tongue 19 upon the central portion of the plate 3, said seating thus restraining the weed guard from further downward movement into line entangling spinner engaging position although permitting it to clear itself from its original position adjacent the hook.

Thus, it will be seen that the weed guard of my invention operates to deflect weeds away from the hook, but when a fish "strikes" at the hook the weed guard will take up a position adjacent the forward end of the lure without, however, becoming entangled with the line.

It will be noted that the weed guard of my invention, although movable with respect to the hook and the line attachment means, has its movement restricted beyond a certain point in either direction whereby the guard operates in a relatively wide area but only in an effective area for the purpose for which it was intended. It will further be noted that the weed guard of my invention is so constructed that the stop means for restricting the movement are integrally united with the weed guard whereby no additional securing means nor plurality of parts are required.

Although I have shown and described preferred forms of my invention, I contemplate that numerous and extensive departures may be made therefrom without departing from the spirit of my invention or the scope of the appended claims.

Having described my invention what I claim is:

1. An artificial lure having a body, a hook carried by said body, a line attaching member disposed forwardly of said body and secured thereto, a weed guard supporting element centrally bored and provided with an aperture medially thereof, a weed guard consisting of a pair of diverging leg portions, an intermediate yoke portion, said yoke portion being provided with an outwardly extending tongue, the yoke of said weed guard being disposed through the central bore of said support element and the tongue of said weed guard being projected through the said aperture, said weed guard being pivotally mounted upon said lure whereby said weed guard is adapted to have movement towards and away from said hook, said tongue acting as a stop to restrict the amount of movement of said guard towards and away from said hook.

2. An artificial lure having a body, a hook carried by said body, a line attaching member disposed forwardly of said body and secured thereto, a weed guard supporting element centrally bored and provided with an aperture medially thereof, a weed guard consisting of a pair of diverging leg portions, an intermediate yoke portion, said yoke portion being provided with an outwardly extending tongue, the yoke of said weed guard being disposed through the central bore of said support element and the tongue of said weed guard being projected through the said aperture, said weed guard being pivotally mounted upon said lure whereby said weed guard is adapted to have movement towards and away from said hook, said tongue acting as a stop to restrict the amount of movement of said guard towards and away from said hook, said tongue adapted to seat upon said support element when said weed guard is in its rearmost hook protecting position and to rest upon the forward portion of the body of said lure when said guard is in its foremost position away from the hook.

LOUIS D. ADAM.